United States Patent
Wang et al.

(10) Patent No.: US 11,798,264 B2
(45) Date of Patent: Oct. 24, 2023

(54) DICTIONARY LEARNING METHOD AND MEANS FOR ZERO-SHOT RECOGNITION

(71) Applicant: Beijing University of Technology, Beijing (CN)

(72) Inventors: Lichun Wang, Beijing (CN); Shuang Li, Beijing (CN); Shaofan Wang, Beijing (CN); Dehui Kong, Beijing (CN); Baocai Yin, Beijing (CN)

(73) Assignee: Beijing University of Technology, Beijing (CN)

( * ) Notice: Subject to any disclaimer, the term of this patent is extended or adjusted under 35 U.S.C. 154(b) by 0 days.

(21) Appl. No.: 17/588,218

(22) Filed: Jan. 29, 2022

(65) Prior Publication Data

US 2023/0131545 A1    Apr. 27, 2023

(30) Foreign Application Priority Data

Oct. 22, 2021  (CN) .......................... 202111237748.X

(51) Int. Cl.
*G06V 10/772*  (2022.01)
*G06V 20/40*  (2022.01)

(52) U.S. Cl.
CPC ............ *G06V 10/772* (2022.01); *G06V 20/41* (2022.01)

(58) Field of Classification Search
CPC .. G06V 10/772; G06V 20/41; G06V 10/7715; G06V 10/82; G06N 20/00; G06F 18/28; G06F 18/214
See application file for complete search history.

(56) References Cited

U.S. PATENT DOCUMENTS

2014/0193074 A1* 7/2014 Huang ................... G06V 10/50
                                                           382/180
2016/0196350 A1* 7/2016 Mau ....................... G06F 16/951
                                                           707/706

OTHER PUBLICATIONS

Generalized Zero Short Learning With Deep Calibration Network by Shichen Liu—2008 (Year: 2008).*
Ali Farhadi, et al., Describing Objects by their Attributes, 2009, pp. 1778-1785, IEEE.
Christoph H. Lampert, et al., Learning to Detect Unseen Object Classes by Between-Class Attribute Transfer, 2009, pp. 951-958, IEEE.
Haofeng Zhang, et al., Adversarial unseen visual feature synthesis for Zero-shot Learning, Neurocomputing, 2019, pp. 12-20, vol. 329.

(Continued)

*Primary Examiner* — Md K Talukder
(74) *Attorney, Agent, or Firm* — Bayramoglu Law Offices LLC

(57) ABSTRACT

Dictionary learning method and means for zero-shot recognition can establish the alignment between visual space and semantic space at category layer and image level, so as to realize high-precision zero-shot image recognition. The dictionary learning method includes the following steps: (1) training a cross domain dictionary of a category layer based on a cross domain dictionary learning method; (2) generating semantic attributes of an image based on the cross domain dictionary of the category layer learned in step (1); (3) training a cross domain dictionary of the image layer based on the image semantic attributes generated in step (2); (4) completing a recognition task of invisible category images based on the cross domain dictionary of the image layer learned in step (3).

5 Claims, 2 Drawing Sheets

(56) References Cited

OTHER PUBLICATIONS

Yang Liu, et al., Label-activating framework for zero-shot learning, Neural Networks, 2020, pp. 1-9, vol. 121.
Shichen Liu, et al., Generalized Zero-Shot Learning with Deep Calibration Network, 32nd Conference on Neural Information Processing Systems (NeurIPS 2018), 2018, pp. 1-11.
Michal Aharon, et al., K-SVD: An Algorithm for Designing Overcomplete Dictionaries for Sparse Representation, IEEE Transactions on Signal Processing, 2006, pp. 4311-4322, vol. 54, No. 11.
Fan Zhu, et al., Weakly-Supervised Cross-Domain Dictionary Learning for Visual Recognition, Int J Comput Vis, 2014, pp. 42-59, vol. 109.

* cited by examiner

DICTIONARY LEARNING METHOD AND MEANS FOR ZERO-SHOT RECOGNITION

CROSS REFERENCE TO THE RELATED APPLICATIONS

This application is based upon and claims priority to Chinese Patent Application No. 202111237748.X, filed on Oct. 22, 2021, the entire contents of which are incorporated herein by reference.

TECHNICAL FIELD

The present invention relates to the technical field of computer vision, and particularly to a dictionary learning method for zero-shot recognition, and a dictionary learning means for zero-shot recognition.

BACKGROUND

Zero-shot learning (ZSL) originated from the problem proposed by Larochelle et al. How to identify an image when there is only a small amount of labeled data or no labeled data. Different from the traditional image recognition, which requires a large amount of data for training, zero-shot learning can recognize images without any training images by the help of auxiliary information. This provides the possibility for the realization of many practical application scenarios. At the same time, it also promotes the development of intelligent system.

It is worth noting that the task of zero-shot learning is to correctly identify the images of categories that have not appeared in the training set. For the above zero-shot learning task, Lampert et al. proposed Animals with Attributes (AWA) data set, in which the training set is composed of images of visible categories and semantic attributes of all categories (including visible and invisible categories); the test set includes images of invisible categories.

In terms of the idea of realizing the task of zero-shot recognition, the existing methods can be roughly divided into two categories: one is zero-shot learning based on unified spatial representation, and the other is zero-shot learning based on generation model.

The method based on unified spatial representation usually projects the visual features and semantic attribute features into the unified embedded space, and uses some distance measurement methods to classify the invisible category images projected into the embedded space. The representative work is the structured embedding method based on category attribute generation proposed by Jiang et al in 2018. This method first generates the category layer features of visual space for visible classes, and then uses the category layer features of visual space and the semantic attribute features corresponding to categories as input to train the cross domain dictionary, that is, the cross domain dictionary is used to establish the association between visual space and semantic space at the category layer. For the invisible category images in the test set, this method proposes three classification methods: The first is to map the invisible category images and category semantic attributes to the embedding space for distance measurement. The second is to map the image to the embedded space, generate semantic attributes at the corresponding image level through the semantic space dictionary, and then measure the distance from the category semantic attributes in the semantic space. The third is to map the category semantic attributes to the embedded space, then generate the category image features through the visual space dictionary, and then measure the distance from the invisible category image in the visual space.

The zero-shot learning method based on the generation model usually generates a large number of invisible category images, and uses the generated invisible category images to train the classification model. With the rise of Generic Advantageous Networks (GAN), many researchers take advantage of its ability to generate samples to realize the task of zero-shot recognition. For example, Xian et al. proposed the method in 2018, used the idea of conditional GAN to construct a generator, and used category semantic attributes as conditions to generate visual features with strong discrimination. Ji et al. proposed invisibility based on dictionary learning in 2019 class pseudo sample generation method. Firstly, the relationship between visible categories and invisible categories is extracted by using semantic attribute features, and then the relationship is used as a coefficient to weight and combine the visible category images, so as to generate invisible category pseudo samples, and then use the pseudo samples to train the invisible category classifier.

Constrained by limited manpower, the existing data sets applied to zero-shot recognition tasks only provide category semantic attributes, but lack image semantic attributes. This leads that some methods to find the relationship between visual space and semantic space can only stay at the category layer, which limits the accuracy of zero-shot recognition task. For example, the method proposed by Jiang et al. uses the cross domain dictionary learning model to establish the relationship between visual space and semantic space at the category layer. However, compared with images, the information extracted from the model learned from the category layer is relatively single. Building only the category layer model will ignore the fine-grained image information.

SUMMARY

The technical problem addressed by the present invention is to overcome the deficiency in the prior art, and to provide a dictionary learning method for zero-shot recognition, which can establish the alignment between visual space and semantic space at category layer and image level, so as to realize high-precision zero-shot image recognition.

The technical solution of the present invention is that, this dictionary learning method for zero-shot recognition, comprises the following steps:
(1) training a cross domain dictionary of a category layer based on a cross domain dictionary learning method;
(2) generating semantic attributes of an image based on the cross domain dictionary of the category layer learned in step (1);
(3) training a cross domain dictionary of the image layer based on the image semantic attributes generated in step (2);
(4) completing a recognition task of invisible category images based on the domain dictionary of the image layer learned in step (3).

Based on the cross domain dictionary learning model, by constraining the consistency of the representation of the sparse space projected by the present visual space data and semantic space data respectively through the spatial dictionary, the association between the visual space and semantic space is established successively in the category layer and the image layer, and by adding the cross domain dictionary at the image level, the alignment between visual space and semantic space can be established at category layer and image level respectively, and more fine-grained image information can be extracted compared with category layer, so as to realize high-precision zero-shot image recognition.

A dictionary learning means for zero-shot recognition is also provided, which comprises:

a first training module, training a cross domain dictionary of a category layer based on a cross domain dictionary learning method;

generation module, generating semantic attributes of an image based on the cross domain dictionary of the category layer learned in the first training module;

a second training module, training a cross domain dictionary of the image layer based on the image semantic attributes generated in the generation module;

recognition module, completing a recognition task of invisible category images based on the domain dictionary of the image layer learned in the second training module.

DETAILED DESCRIPTION OF THE EMBODIMENTS

Figure 1:
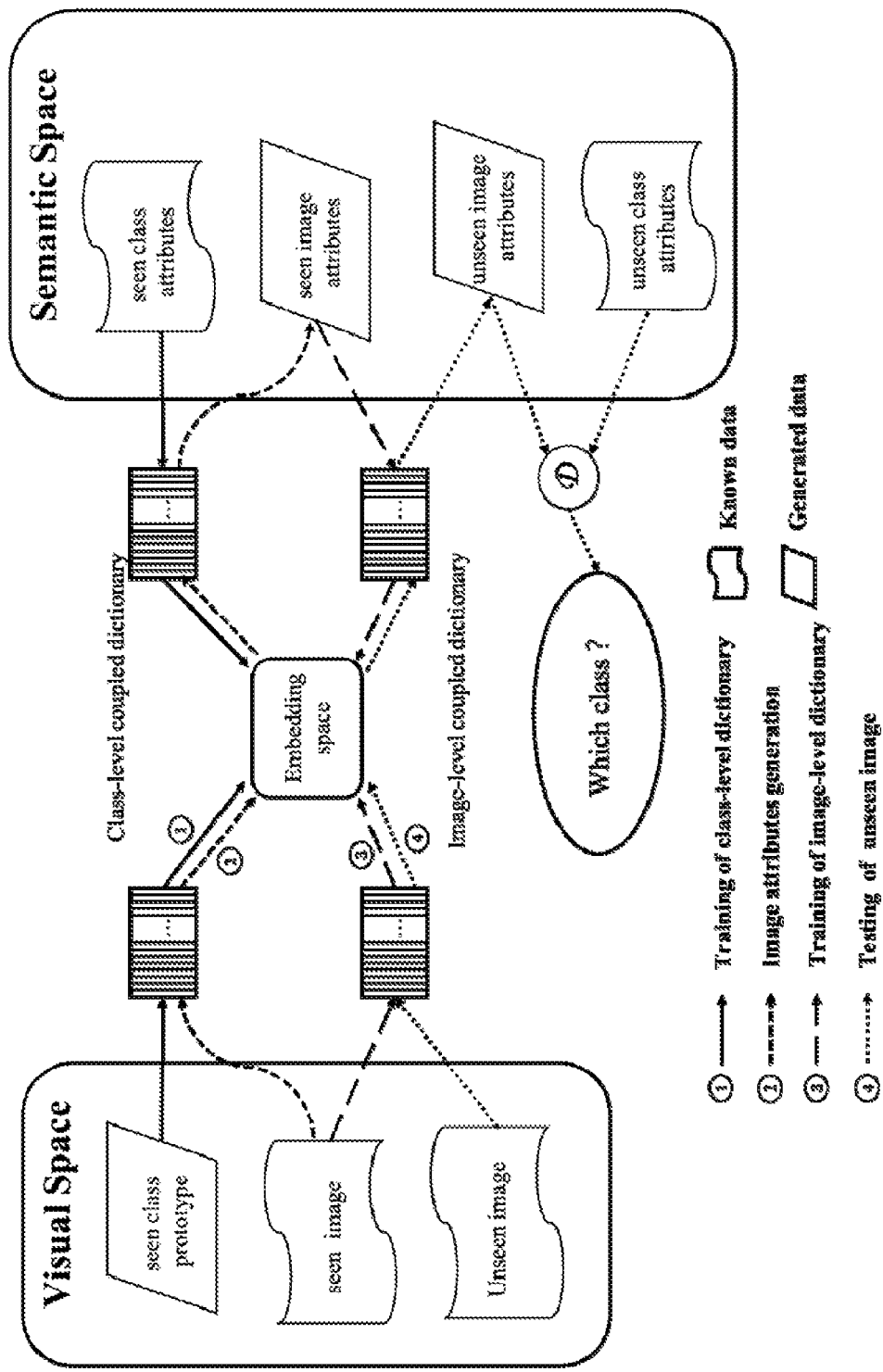
FIG. 1 is a frame diagram of the present invention, in which the data provided in the data set is in the wave rectangular box and the generated data is in the rectangular box. The figure shows three training steps for the model and one testing step, in which the comparison in semantic space is shown in the testing step.
Figure 2:
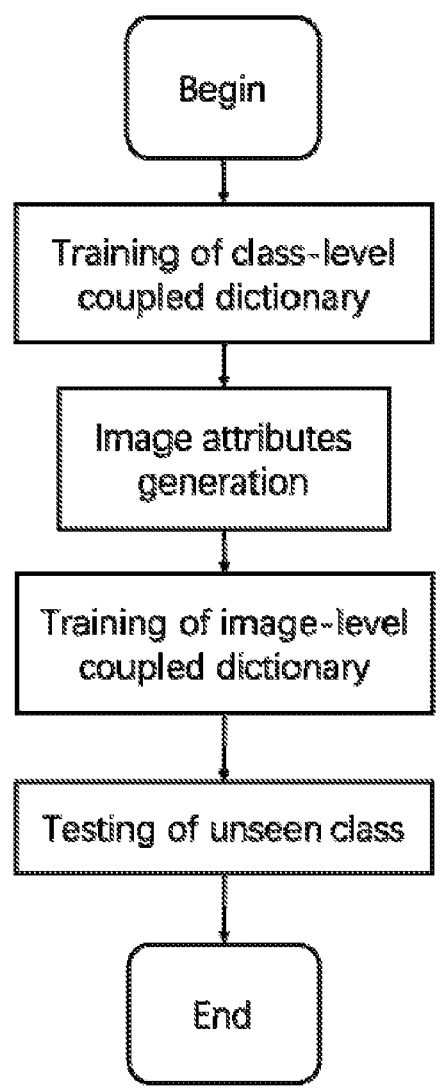
FIG. 2 shows a flowchart of a dictionary learning method for zero-shot recognition according to the present invention.

As shown as FIG. 2, this dictionary learning method for zero-shot recognition, comprises the following steps:

(1) training a cross domain dictionary of a category layer based on a cross domain dictionary learning method;

(2) generating semantic attributes of an image based on the cross domain dictionary of the category layer learned in step (1);

(3) training a cross domain dictionary of the image layer based on the image semantic attributes generated in step (2);

(4) completing a recognition task of invisible category images based on the domain dictionary of the image layer learned in step (3).

Based on the cross domain dictionary learning model, by constraining the consistency of the representation of the sparse space projected by the present visual space data and semantic space data respectively through the spatial dictionary, the association between the visual space and semantic space is established successively in the category layer and the image layer, and by adding the cross domain dictionary at the image level, the alignment between visual space and semantic space can be established at category layer and image level respectively, and more fine-grained image information can be extracted compared with category layer, so as to realize high-precision zero-shot image recognition.

Preferably, the step (1) comprises:

(1.1) extracting a category prototype $P_v$ of visual space by calculating a category center of a visible category image, the formula is as follows:

$$L_p = \|Y_v - P_v H\|_F^2, \quad (1)$$

wherein, $Y_v$ is a sample characteristic matrix, H is a sample label matrix;

(1.2) forming a pair of inputs with the category prototype $P_v$ and category semantic attributes $P_s$, training the cross domain dictionary at the category layer, and establishing a relationship between visual space and semantic space at the category layer by constraining the category prototype and category semantic attributes to share the sparsity coefficient; a specific representation is formula (2)

$$L_{seen} = \|P_v - D_v X_p\|_F^2 + \lambda \|P_s - D_s X_p\|_F^2, \quad (2)$$

wherein, the first term is a reconstruction error term of visual space dictionary, the second term is a reconstruction error term of semantic space dictionary, $D_v$ is a visual space dictionary, $D_s$ is a semantic space dictionary, $X_p$ is a sparse coefficient matrix, $\lambda$ is a harmonic parameter;

(1.3) introducing an adaptive loss function of invisible category as formula (3), in order to reduce an impact of domain difference between visible category and invisible category on model accuracy and improve the recognition ability of the model for invisible category samples, $$L_{unseen} = \|P_v^u - D_v X_p^u\|_F^2 + \lambda \|P_s^u - D_s X_p^u\|_F^2, \quad (3)$$

wherein, $P_v^u$ is a category prototype of invisible category to be solved, $P_s^u$ is a semantic attribute matrix of invisible category, $X_p^u$ is a sparse coefficient matrix corresponding to invisible category;

a whole loss function of class-level model is as follows:

$$L_{class} = L_{seen} + \alpha L_{unseen} + \beta L_p, \quad (4)$$

training objective of the category layer is to minimize the loss function shown in equation (4) for solving variables including: visual space dictionary $D_v$, semantic space dictionary $D_s$, seen category prototype $P_v$, invisible category prototype $P_v^u$, seen category sparse coefficient $X_p$, and invisible category sparse coefficient $X_p^u$.

Preferably, the step (2) comprises:

(2.1) generating a sparse coefficient $X_y$ of the image by using the visual space dictionary $D_v$, and a specific representation is formula (5):

$$\min_{X_y} \|Y_v - D_v X_y\|_F^2 + \omega_x \|X_y - X_p H\|_F^2, \quad (5)$$

wherein, the first term is a reconstruction error term, the second term is a constraint term which constrains the generated image sparse coefficient to be closed to a sparse coefficient generated by its category based on the same visual space dictionary $D_v$, $\omega_x$ is a harmonic parameter;

(2.2) generating a semantic attribute of the image $Y_s$ by using the semantic space dictionary $D_s$ and its category semantic attribute $P_s$, a specific representation is formula (6):

$$Y_s = \frac{\sqrt{\lambda} D_s X_y + \sqrt{w_p} P_s H}{\sqrt{\lambda} + \sqrt{w_p}}, \quad (6)$$

wherein, $\omega_p$ is a harmonic parameter.

Preferably, the step (3) comprises:

training the cross domain dictionary of the image layer based on the image semantic attributes generated in step (2), in order to further find information of the image and improve generalization performance of the model, a specific representation is formula (7):

$$L_{seen} = \|Y_v - D_v^{image} X\|_F^2 + \mu \|Y_s - D_s^{image} X\|_F^2, \quad (7)$$

wherein, the first term is a reconstruction error term of visual space; a second term is a reconstruction error term of semantic space, $D_v^{image}$ and $D_s^{image}$ is a dictionary of visual space in the image layer and a dictionary of semantic space in the image layer, respectively; X is a sparse coefficient, and μ is a harmonic parameter.

Preferably, the step (4) comprises:

in the aspect of comparison of visual space:

generating a sparse coefficient $X^u$ through semantic space dictionary of the image layer $D_s^{image}$ firstly by the invisible category semantic attribute $P_s^u$, which is formula (8):

$$\min_{X^u} \|P_s^u - D_s^{image} X^u\|_F^2, \quad (8)$$

then, generating representation whose category is in visual space $p_v^u = D_v^{image} X^u$ by using the dictionary of visual space in the image layer $D_v^{image}$, computing cosine distance between a test image and a description of each category $P_v^u[c]$ respectively, and judging the category of the test image according to the distance, which is formula (9):

$$\min_c (D_c(P_v^u[c], y_v)). \quad (9);$$

in the aspect of comparison of sparse domain:

extracting its representation in sparse space according to the visual space dictionary of the image layer by the test image, which is formula (10):

$$\min_{x^u} \|y_v - D_v^{image} X^u\|_F^2. \quad (10)$$

computing cosine distance between $x^u$ and the description of each category in sparse space $X^u[c]$, the closest category to the test image is the category of the image, which is formula (11):

$$\min_c (D_c(X^u[c], x^u)). \quad (11);$$

in the aspect of comparison of semantic space:

firstly, encoding the test image to attain $x^u$ according to the visual space dictionary of the image layer; then, generating the semantic attribute of the image $y_s = D_s^{image} x^u$ according to the semantic space dictionary of the image layer; computing cosine distance between $y_s$ and semantic attributes of various categories, and judging the category of the test image according to the distance, which is formula (12):

$$\min_c (D_c(P_s^u[c], y_s)). \quad (12).$$

Preferably, testing the method on two image data sets based on zero-shot recognition task: AwA data set and aPY data set, and comparing recognition accuracy with current mainstream zero-shot recognition models, including Structure Joint Embedding (SJE), Embarrassingly Simple ZSL (EZSL), Synthesized Classifiers (SYNC), Semantic Autoencoder (SAE), Coupled Dictionary Learning (CDL), Attribute Label-Embedding (ALE), Convex Semantic Embeddings (CONSE), Latent Embeddings (LATEM), Deep Visual-Semantic (DEVISE);

AwA is an animal image data set, including 50 animal categories and 30475 images, and each category has 85 annotated attributes; the standard division of zero-shot recognition experiment is to use 40 categories as seen categories and the other 10 categories as unseen categories.

A dictionary learning means for zero-shot recognition is also provided, which comprises:

a first training module, training a cross domain dictionary of a category layer based on a cross domain dictionary learning method;

generation module, generating semantic attributes of an image based on the cross domain dictionary of the category layer learned in the first training module;

a second training module, training a cross domain dictionary of the image layer based on the image semantic attributes generated in the generation module;

recognition module, completing a recognition task of invisible category images based on the domain dictionary of the image layer learned in the second training module.

Preferably, the first training module performs:

extracting a category prototype $P_v$ of visual space by calculating a category center of a visible category image, the formula is as follows:

$$L_p = \|Y_v - P_v H\|_F^2, \quad (1)$$

wherein, $Y_v$ is a sample characteristic matrix, H is a sample label matrix;

forming a pair of inputs with the category prototype $P_v$ and category semantic attributes $P_s$, training the cross domain dictionary at the category layer, and establishing a relationship between visual space and semantic space at the category layer by constraining the category prototype and category semantic attributes to share the sparsity coefficient; a specific representation is formula (2)

$$L_{seen} = \|P_v - D_v X_p\|_F^2 + \lambda \|P_s - D_s X_p\|_F^2, \quad (2)$$

wherein, the first term is a reconstruction error term of visual space dictionary, the second term is a reconstruction error term of semantic space dictionary, $D_v$ is a visual space dictionary, $D_s$ is a semantic space dictionary, $X_p$ is a sparse coefficient matrix, $\lambda$ is a harmonic parameter;

introducing an adaptive loss function of invisible category as formula (3), in order to reduce an impact of domain difference between visible category and invisible category on model accuracy and improve the recognition ability of the model for invisible category samples, $$L_{unseen} = \|P_v^u - D_v X_p^u\|_F^2 + \lambda \|P_s^u - D_s X_p^u\|_F^2 \quad (3)$$

wherein, $P_v^u$ is a category prototype of invisible category to be solved, $P_s^u$ is a semantic attribute matrix of invisible category, $X_p^u$ is a sparse coefficient matrix corresponding to invisible category;

a whole loss function of class-level model is as follows:

$$L_{class} = L_{seen} + \alpha L_{unseen} + \beta L_p, \quad (4)$$

training objective of the category layer is to minimize the loss function shown in equation (4) for solving variables including: visual space dictionary $D_v$, semantic space dictionary $D_s$, seen category prototype $P_v$, invisible category prototype $P_v^u$, seen category sparse coefficient $X_p$, and invisible category sparse coefficient $X_p^u$.

Preferably, the generation module performs:

generating a sparse coefficient $X_y$ of the image by using the visual space dictionary $D_v$, and a specific representation is formula (5):

$$\min_{X_y} \|Y_v - D_v X_y\|_F^2 + \omega_x \|X_y - X_p H\|_F^2, \quad (5)$$

wherein, the first term is a reconstruction error term, the second term is a constraint term which constrains the generated image sparse coefficient to be closed to a sparse coefficient generated by its category based on the same visual space dictionary $D_v$, $\omega_x$ is a harmonic parameter;

generating a semantic attribute of the image $Y_s$ by using the semantic space dictionary $D_s$ and its category semantic attribute $P_s$, a specific representation is formula (6):

$$Y_s = \frac{\sqrt{\lambda} D_s X_y + \sqrt{w_p} P_s H}{\sqrt{\lambda} + \sqrt{w_p}}, \quad (6)$$

wherein, $\omega_p$ is a harmonic parameter;

the second training module performs:

training the cross domain dictionary of the image layer based on the image semantic attributes generated in step (2), in order to further find information of the image and improve generalization performance of the model, a specific representation is formula (7):

$$L_{seen}=\|Y_v-D_v^{image}X\|_F^2+\mu\|Y_s-D_s^{image}X\|_F^2, \quad (7)$$

wherein, the first term is a reconstruction error term of visual space; a second term is a reconstruction error term of semantic space, $D_v^{image}$ and $D_s^{image}$ is a dictionary of visual space in the image layer and a dictionary of semantic space in the image layer, respectively; X is a sparse coefficient, and μ is a harmonic parameter.

Preferably, the identification module performs:

in the aspect of comparison of visual space:

generating a sparse coefficient $X^u$ through semantic space dictionary of the image layer $D_s^{image}$ firstly by the invisible category semantic attribute $P_s^u$, which is formula (8):

$$\min_{X^u}\|P_s^u-D_s^{image}X^u\|_F^2, \quad (8)$$

then, generating representation whose category is in visual space $P_v^{u'}=D_v^{image}X^u$ by using the dictionary of visual space in the image layer $D_v^{image}$, computing cosine distance between a test image and a description of each category $P_v^{u'}[c]$ respectively, and judging the category of the test image according to the distance, which is formula (9):

$$\min_c(D_c(P_v^{u'}[c],y_v)). \quad (9);$$

in the aspect of comparison of sparse domain:

extracting its representation in sparse space according to the visual space dictionary of the image layer by the test image, which is formula (10):

$$\min_{X^u}\|y_v-D_v^{image}X^u\|_F^2. \quad (10)$$

computing cosine distance between $X^u$ and the description of each category in sparse space $X^u[c]$, the closest category to the test image is the category of the image, which is formula (11):

$$\min_c(D_c(X^u[c],x^u)). \quad (11);$$

in the aspect of comparison of semantic space:

firstly, encoding the test image to attain $x^u$ according to the visual space dictionary of the image layer; then, generating the semantic attribute of the image $y_s=D_s^{image}x^u$ according to the semantic space dictionary of the image layer; computing cosine distance between $y_s$ and semantic attributes of various categories, and judging the category of the test image according to the distance, which is formula (12):

$$\min_c(D_c(P_s^u[c],y_s)). \quad (12).$$

To test the effectiveness of the proposed method, experiments of the invention are carried out on two image data sets (AwA data set and aPY data set) based on zero-shot recognition tasks, and its recognition accuracy is compared with the current mainstream zero-shot recognition models, including SJE, EZSL, SYNC, SAE, CDL. ALE. CONSE, LATEM, DEVISE. Table 1 and table 2 respectively show the comparison of the zero-shot recognition accuracy of the method proposed in the invention and other existing methods on the two data sets.

AwA is an animal image data set, which contains 50 animal categories and 30475 images, and each category has 85 annotated attributes. The standard division of zero-shot recognition experiment is to use 40 categories as seen categories and the other 10 categories as unseen categories.

resnet101 is used to extract image features in the invention, and the feature dimension is 2048 dimensions. There are 40 atoms in cross domain dictionary at the category layer and 200 atoms in cross domain dictionary at the image layer, parameter λ=1, parameter α=1, parameter β=1, parameter μ=1, parameter $\omega_x$=1, parameter $\omega_p$=1e$^{-10}$. The regnization accuracy of the method proposed by the invention and the compared methods are shown in Table 1. It can be seen that the method proposed by the invention obtains the highest accuracy on this data set.

TABLE 1

| Method | regnization accuracy (%) |
|---|---|
| SAE | 53.0 |
| SYNC | 54.0 |
| EZSL | 58.2 |
| ALE | 59.9 |
| SJE | 65.6 |
| CDL | 69.9 |
| the method proposed by the invention | 71.0 | aPY data set contains 32 categories and 15339 images, each of which has 64 dimensional semantic attributes. According to the standard division method, 20 categories are regarded as seen categories and the other 12 categories are regarded as unseen categories in the invention.

resnet101 is used to extract image features in the invention, and the feature dimension is 2048 dimensions. There are 20 atoms in cross domain dictionary at the category layer and 200 atoms in cross domain dictionary at the image layer, parameter λ=1, parameter α=1, parameter β=1, parameter μ=1, parameter $\omega_x$=1, parameter $\omega_p$=1. The regnization accuracy of the method proposed by the invention and the compared methods are shown in Table 2. It can be seen that the method proposed by the invention obtains the highest accuracy on this data set.

TABLE 2

| Method | regnization accuracy (%) |
|---|---|
| SYNC | 23.9 |
| CONSE | 26.9 |
| SJE | 32.9 |
| LATEM | 35.2 |
| EZSL | 38.3 |
| ALE | 39.7 |
| DEVISE | 39.8 |
| CDL | 43.0 |
| the method proposed by the invention | 47.3 |

The above contents are only the preferable embodiments of the present invention, and do not limit the present invention in any manner. Any improvements, amendments and alternative changes made to the above embodiments according to the technical spirit of the present invention shall fall within the claimed scope of the present invention.

What is claimed is:

1. A dictionary learning method for zero-shot recognition, comprises the following steps:
   (1) training a cross domain dictionary of a category layer based on a cross domain dictionary learning method;
   (2) generating semantic attributes of an image based on the cross domain dictionary of the category layer learned in step (1);
   (3) training a cross domain dictionary of the image layer based on the image semantic attributes generated in step (2);

(4) completing a recognition task of invisible category images based on the cross domain dictionary of the image layer learned in step (3);

the step (1) comprises:

(1.1) extracting a category prototype $P_V$ of visual space by calculating a category center of a visible category image, the formula is as follows:

$$\mathcal{L}_p = \|Y_v - P_v H\|_F^2, \quad (1)$$

wherein, $Y_v$ is a sample characteristic matrix, H is a sample label matrix;

(1.2) forming a pair of inputs with the category prototype $P_v$ and category semantic attributes $P_s$, training the cross domain dictionary at the category layer, and establishing a relationship between visual space and semantic space at the category layer by constraining the category prototype and category semantic attributes to share the sparsity coefficient; a specific representation is formula (2)

$$\mathcal{L}_{seen} = \|P_v - D_v X_p\|_F^2 + \lambda \|P_s - D_s X_p\|_F^2, \quad (2)$$

wherein, the first term is a reconstruction error term of visual space dictionary, the second term is a reconstruction error term of semantic space dictionary, $D_v$ is a visual space dictionary, $D_s$ is a semantic space dictionary, $X_p$ is a sparse coefficient matrix, $\lambda$ is a harmonic parameter;

(1.3) introducing an adaptive loss function of invisible category as formula (3), in order to reduce an impact of domain difference between visible category and invisible category on model accuracy and improve the recognition ability of the model for invisible category samples, $$\mathcal{L}_{unseen} = \|P_v^u - D_v X_p^u\|_F^2 + \lambda \|P_s^u - D_s X_p^u\|_F^2, \quad (3)$$

wherein, $P_v^u$ is a category prototype of unseen category to be solved, $P_s^u$ is a semantic attribute matrix of invisible category, $X_p^u$ is a sparse coefficient matrix corresponding to invisible category;

a whole loss function of class-level model is as follows:

$$\mathcal{L}_{class} = L_{seen} + \alpha L_{unseen} + \beta L_p, \quad (4)$$

training objective of the category layer is to minimize the loss function shown in equation (4) for solving variables including: visual space dictionary $D_v$, semantic space dictionary $D_s$, seen category prototype $P_v$, invisible category prototype $P_v^u$, seen category sparse coefficient $X_p$, and invisible category sparse coefficient $X_p^u$.

2. The dictionary learning method for zero-shot recognition according to claim 1, the step (2) comprises:

(2.1) generating a sparse coefficient $X_y$ of the image by using the visual space dictionary $D_v$, and a specific representation is formula (5):

$$\min_{X_y} \|Y_v - D_v X_y\|_F^2 + \omega_x \|X_y - X_p H\|_F^2, \quad (5)$$

wherein, the first term is a reconstruction error term, the second term is a constraint term which constrains the generated image sparse coefficient to be closed to a sparse coefficient generated by its category based on the same visual space dictionary $D_v$, $w_x$ is a harmonic parameter;

(2.2) generating a semantic attribute of the image $Y_s$ by using the semantic space dictionary $D_s$ and its category semantic attribute $P_s$, a specific representation is formula (6):

$$Y_s = \frac{\sqrt{\lambda} D_s X_y + \sqrt{w_p} P_s H}{\sqrt{\lambda} + \sqrt{w_p}}, \quad (6)$$

wherein, $w_p$ is a harmonic parameter.

3. The dictionary learning method for zero-shot recognition according to claim 2, the step (3) comprises:

training the cross domain dictionary of the image layer based on the image semantic attributes generated in step (2), in order to further find information of the image and improve generalization performance of the model, a specific representation is formula (7):

$$\mathcal{L}_{seen} = \|Y_v - D_v^{image} X\|_F^2 + \mu \|Y_s - D_s^{image} X\|_F^2, \quad (7)$$

wherein, the first term is a reconstruction error term of visual space; a second term is a reconstruction error term of semantic space, $D_v^{image}$ and $D_s^{image}$ is a dictionary of visual space in the image layer and a dictionary of semantic space in the image layer, respectively; X is a sparse coefficient, and $\mu$ is a harmonic parameter.

4. The dictionary learning method for zero-shot recognition according to claim 3, the step (4) comprises:

in the aspect of comparison of visual space:

generating a sparse coefficient $X^u$ through semantic space dictionary of the image layer $D_s^{image}$ firstly by the invisible category semantic attribute $P_s^u$, which is formula (8):

$$\min_{X^u} \|P_s^u - D_s^{image} X^u\|_F^2, \quad (8)$$

then, generating representation whose category is in visual space $P_v^{u'} = D_v^{image} X^u$ by using the dictionary of visual space in the image layer $D_v^{image}$, computing cosine distance between a test image and a description of each category $P_v^{u'}[c]$ respectively, and judging the category of the test image according to the distance, which is formula (9):

$$\min_c(D_c(P_v^{u'}[c], y_v)), \quad (9);$$

in the aspect of comparison of sparse domain:

extracting its representation in sparse space according to the visual space dictionary of the image layer by the test image, which is formula (10):

$$\min_{x^u} \|y_v - D_v^{image} x^u\|_F^2, \quad (10)$$

computing cosine distance between $X^u$ and the description of each category in sparse space $X^u[c]$, the closest category to the test image is the category of the image, which is formula (11):

$$\min_c(D_c(X^u[c], x^u)), \quad (11);$$

in the aspect of comparison of semantic space:

firstly, encoding the test image to attain $x^u$ according to the visual space dictionary of the image layer; then, generating the semantic attribute of the image $y_s = D_s^{image} x^u$ according to the semantic space dictionary of the image layer; computing cosine distance between $y_s$ and semantic attributes of various categories, and judging the category of the test image according to the distance, which is formula (12):

$$\min_c(D_c(P_s^u[c], y_s)), \quad (12).$$

5. The dictionary learning method for zero-shot recognition according to claim 4, testing the method on two image data sets based on zero-shot recognition task: AwA data set and aPY data set, and comparing recognition accuracy with current mainstream zero-shot recognition models, including SJE, EZSL, SYNC, SAE, CDL, ALE, CONSE, LATEM, DEVISE;

AwA is an animal image data set, including 50 animal categories and 30475 images, and each category has 85 annotated attributes; the standard division of zero-shot recognition experiment is to use 40 categories as seen categories and the other 10 categories as unseen categories.

* * * * *